(12) United States Patent
Coppola et al.

(10) Patent No.: US 10,267,261 B2
(45) Date of Patent: Apr. 23, 2019

(54) METHODS OF JOINING COMPONENTS IN VEHICLE ASSEMBLIES

(71) Applicant: GM Global Technology Operations LLC, Detroit, MI (US)

(72) Inventors: Anthony M. Coppola, Royal Oak, MI (US); Hamid G. Kia, Bloomfield Hills, MI (US); Paul M. Najt, Blooomfield Hills, MI (US); Russell P. Durrett, Bloomfield Hills, MI (US); Michael A. Potter, Grass Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 116 days.

(21) Appl. No.: 15/225,051

(22) Filed: Aug. 1, 2016

(65) Prior Publication Data
US 2018/0030924 A1    Feb. 1, 2018

(51) Int. Cl.
*F02F 7/00* (2006.01)
*B29C 65/00* (2006.01)
(Continued)

(52) U.S. Cl.
CPC ............ *F02F 7/0095* (2013.01); *B29C 65/48* (2013.01); *B29C 65/562* (2013.01); *B29C 65/564* (2013.01); *B29C 65/72* (2013.01); *B29C 66/21* (2013.01); *B29C 66/54* (2013.01); *B29C 66/721* (2013.01); *B29C 70/845* (2013.01); *F02F 7/0085* (2013.01); *B29C 65/483* (2013.01); *B29C 65/484* (2013.01); *B29C 66/71* (2013.01);
(Continued)

(58) Field of Classification Search
CPC ..... F02F 7/0095; F02F 7/0085; B29C 70/845; B29C 65/562; B29C 65/48
See application file for complete search history.

(56) References Cited

U.S. PATENT DOCUMENTS

| 1,534,411 A | 4/1925 | Potter |
| 3,481,316 A | 12/1969 | Olson et al. |

(Continued)

FOREIGN PATENT DOCUMENTS

| CN | 107672189 A | 2/2018 |
| CN | 107672196 A | 2/2018 |

(Continued)

OTHER PUBLICATIONS

Guimond et al.; "Composite V-6 Diesel Engine Concept;" SAE Technical Paper 920084; Feb. 1992; 8 pages.
(Continued)

*Primary Examiner* — Chirstopher T Schatz
(74) *Attorney, Agent, or Firm* — Harness, Dickey & Pierce, P.L.C.

(57) ABSTRACT

Methods of joining components to form vehicle assemblies, such as engine assemblies, are provided. The methods include arranging a first component having a first channel defined therein in a mold, arranging a second component having a second channel defined therein in the mold, and aligning the first and second channel to define a pin-receiving channel. At least one polymeric composite pin is inserted into the pin-receiving channel thereby joining the first and second components, wherein an adhesive is disposed adjacent to at least a portion of the polymeric composite pin.

16 Claims, 10 Drawing Sheets

(51) Int. Cl.
*B29C 65/48* (2006.01)
*B29C 65/56* (2006.01)
*B29C 70/84* (2006.01)
*B29C 65/72* (2006.01)
*B29L 31/30* (2006.01)
*B29L 31/00* (2006.01)

(52) U.S. Cl.
CPC .... *B29C 66/7212* (2013.01); *B29C 66/72141* (2013.01); *B29C 66/72143* (2013.01); *B29C 66/73921* (2013.01); *B29C 66/73941* (2013.01); *B29C 66/742* (2013.01); *B29L 2031/30* (2013.01); *B29L 2031/748* (2013.01); *B29L 2031/749* (2013.01); *B29L 2031/7496* (2013.01); *F02F 7/0087* (2013.01); *F05C 2225/00* (2013.01); *F05C 2251/048* (2013.01); *F05C 2253/16* (2013.01)

(56) References Cited

U.S. PATENT DOCUMENTS

| | | | |
|---|---|---|---|
| 4,446,827 A | | 5/1984 | Kubozuka |
| 4,446,906 A | | 5/1984 | Ackerman et al. |
| 4,450,610 A | | 5/1984 | Schaper |
| 4,659,268 A | * | 4/1987 | Del Mundo ............ F16B 19/04 411/34 |
| 4,726,334 A | | 2/1988 | Holtzberg et al. |
| 4,848,292 A | | 7/1989 | Holtzberg |
| 4,901,692 A | | 2/1990 | Madden |
| 4,930,470 A | | 6/1990 | Kabat et al. |
| 5,062,393 A | | 11/1991 | Smith et al. |
| 5,083,537 A | | 1/1992 | Onofrio et al. |
| 5,176,456 A | | 1/1993 | Takebayashi et al. |
| 5,207,120 A | | 5/1993 | Arnold et al. |
| 5,259,677 A | | 11/1993 | Degrange et al. |
| 5,301,423 A | | 4/1994 | Clark et al. |
| 5,370,087 A | | 12/1994 | Guimond et al. |
| 5,435,059 A | | 7/1995 | Chawla |
| 5,737,838 A | | 4/1998 | Niimi et al. |
| 5,922,472 A | * | 7/1999 | Keener .................... B21K 1/58 148/251 |
| 5,947,667 A | * | 9/1999 | Cassatt ............... F16B 19/1063 411/34 |
| 6,223,702 B1 | | 5/2001 | Achenbach et al. |
| 6,412,366 B1 | | 7/2002 | Leith |
| 6,684,844 B1 | | 2/2004 | Wang et al. |
| 6,959,683 B2 | | 11/2005 | Gokan |
| 7,191,770 B1 | | 3/2007 | Anderson et al. |
| 7,367,303 B2 | | 5/2008 | Yamamoto et al. |
| 7,819,462 B1 | | 10/2010 | Owens |
| 8,033,592 B2 | | 10/2011 | Hsu et al. |
| 8,109,492 B2 | | 2/2012 | Winocur |
| 8,757,028 B2 | | 6/2014 | Broughton et al. |
| 8,961,724 B2 | | 2/2015 | Polewarczyk et al. |
| 9,227,673 B2 | | 1/2016 | Berger et al. |
| 9,302,733 B2 | | 4/2016 | Schlanger |
| 9,416,749 B2 | | 8/2016 | Maki et al. |
| 9,527,132 B2 | | 12/2016 | Lowe et al. |
| 2002/0104505 A1 | | 8/2002 | Ericson |
| 2004/0226393 A1 | | 11/2004 | Hong |
| 2006/0102110 A1 | | 5/2006 | Takenaka et al. |
| 2007/0277645 A1 | | 12/2007 | Weisskopf et al. |
| 2009/0126180 A1 | * | 5/2009 | Keener .................... F16B 19/06 29/505 |
| 2009/0223479 A1 | | 9/2009 | Schoell |
| 2011/0300333 A1 | * | 12/2011 | Kallinen ................ B29C 70/46 428/138 |
| 2012/0015134 A1 | | 1/2012 | Walker et al. |
| 2012/0085313 A1 | | 4/2012 | Reisser |
| 2013/0018988 A1 | | 1/2013 | Peek |
| 2013/0065042 A1 | | 3/2013 | Esser-Kahn et al. |
| 2013/0189888 A1 | | 7/2013 | Patrick et al. |
| 2014/0072386 A1 | * | 3/2014 | Baugh, Sr. ............... F16B 19/00 411/337 |
| 2016/0084295 A1 | | 3/2016 | Murrish et al. |
| 2016/0230696 A1 | | 8/2016 | Williams et al. |
| 2016/0264082 A1 | | 9/2016 | Berger et al. |
| 2017/0074205 A1 | | 3/2017 | Maki et al. |
| 2018/0029316 A1 | | 2/2018 | Coppola et al. |
| 2018/0030920 A1 | | 2/2018 | Wicks et al. |
| 2018/0030922 A1 | | 2/2018 | Kia et al. |
| 2018/0030923 A1 | | 2/2018 | Coppola et al. |
| 2018/0031027 A1 | | 2/2018 | Coppola et al. |
| 2018/0037510 A1 | | 2/2018 | Durrett et al. |
| 2018/0038276 A1 | | 2/2018 | Durrett et al. |
| 2018/0038308 A1 | | 2/2018 | Durrett et al. |
| 2018/0186144 A1 | | 7/2018 | Durrett et al. |

FOREIGN PATENT DOCUMENTS

| | | |
|---|---|---|
| CN | 107676188 A | 2/2018 |
| CN | 107676189 A | 2/2018 |
| CN | 107676370 A | 2/2018 |
| DE | 3011358 A1 | 10/1981 |
| DE | 3013135 A1 | 10/1981 |
| DE | 19818589 A1 | 11/1999 |
| DE | 102012018330 A1 | 8/2013 |
| DE | 102013015431 A1 | 3/2015 |
| DE | 102014224827 A1 | 6/2015 |
| DE | 102017213313 A1 | 2/2018 |
| DE | 102017213315 A1 | 2/2018 |
| DE | 102017213316 A1 | 2/2018 |
| DE | 102017213317 A1 | 2/2018 |
| DE | 102017213319 A1 | 2/2018 |
| EP | 0345424 A1 | 12/1989 |
| EP | 0361367 A2 | 4/1990 |
| FR | 1593248 A | 5/1970 |
| JP | 2012192543 A | 10/2012 |
| WO | WO-20120117876 A1 | 9/2012 |
| WO | WO-2014153065 A1 | 9/2014 |

OTHER PUBLICATIONS

Esser-Kahn et al.; "Three-Dimensional Microvascular Fiber-Reinforced Composites;" Advanced Materials; vol. 23; 2011; pp. 3654-3658.
Brosius et al.; "Phenolics for High Temperature Applications in Small Engine Technologies (Cost Effective Performance Advantages);" SAE Technical Paper 951809; 1995; pp. 405-414.
Buckley et al.; "A Prediction of Weight Reduction and Performance Improvements Attainable through the use of Fiber Reinforced Composites in I.C. Engines;" SAE Technical Paper 2005-01-3693; Oct. 2005; 17 pages.
"Dow Introduces Bonding Process;" Materials Today; http://www.materialstoday.com/carbon-fiber/news/dow-introduces-bonding process; May 10, 2016; 1 page.
First Office Action in German Application No. 102017213316.3 from the German Patent Office dated Apr. 4, 2018 and correspondence from Manitz, Finsterwald & Partner summarizing contents; 6 pages.
Second Office Action in German Application No. 102017213316.3 from the German Patent Office dated Jun. 7, 2018 and correspondence from Manitz, Finsterwald & Partner summarizing contents; 6 pages.
Coppola, Anthony M. et al., U.S. Appl. No. 16/108,449, filed Aug. 22, 2018 entitled "Polymeric and Metal Cylinder Head and Method of Making the Same," 67 pages.
First Office Action in Chinese Patent Application No. 201710645156.9 dated Feb. 15, 2019 with English language machine translation, 9 pages.

\* cited by examiner

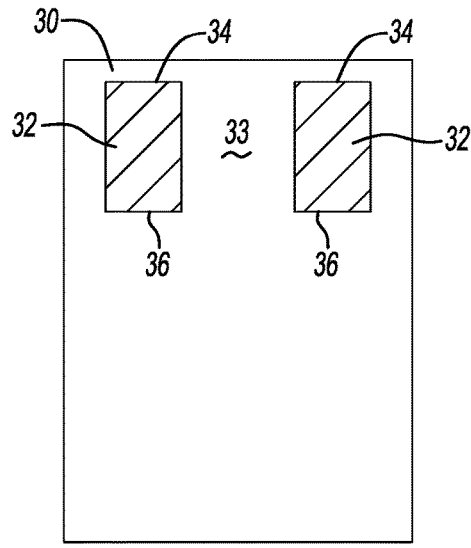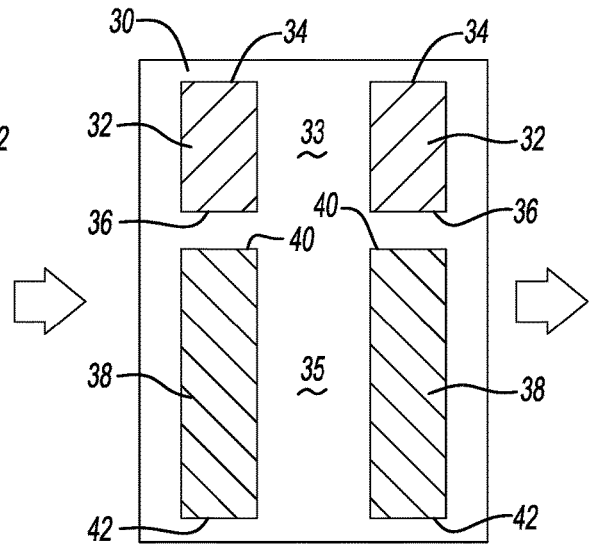
*Fig-1A*  *Fig-1B*
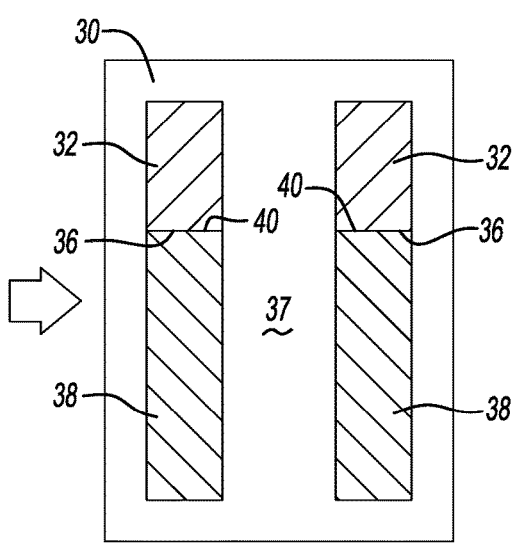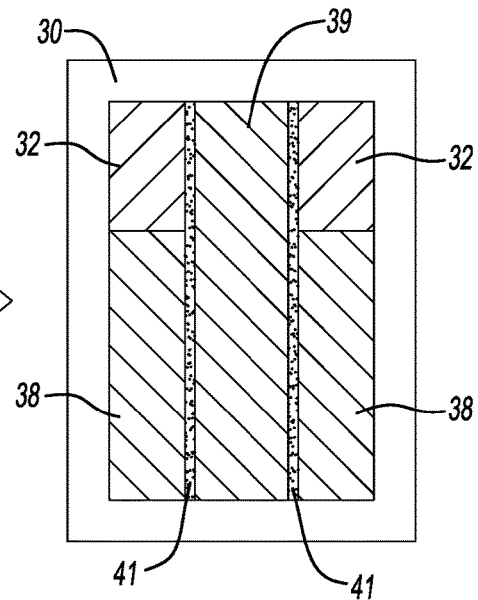
*Fig-1C*  *Fig-1D*

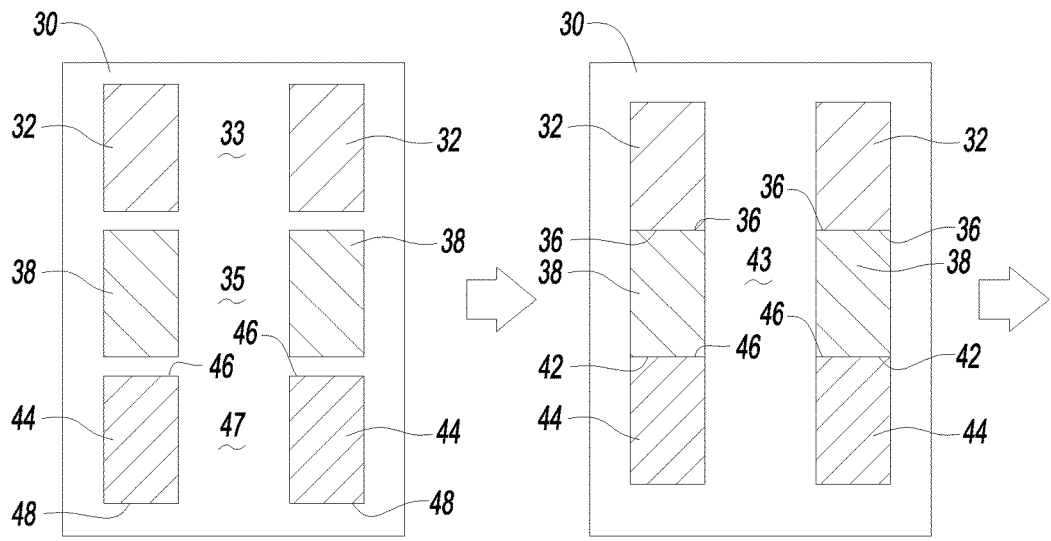
*Fig-2A*    *Fig-2B*
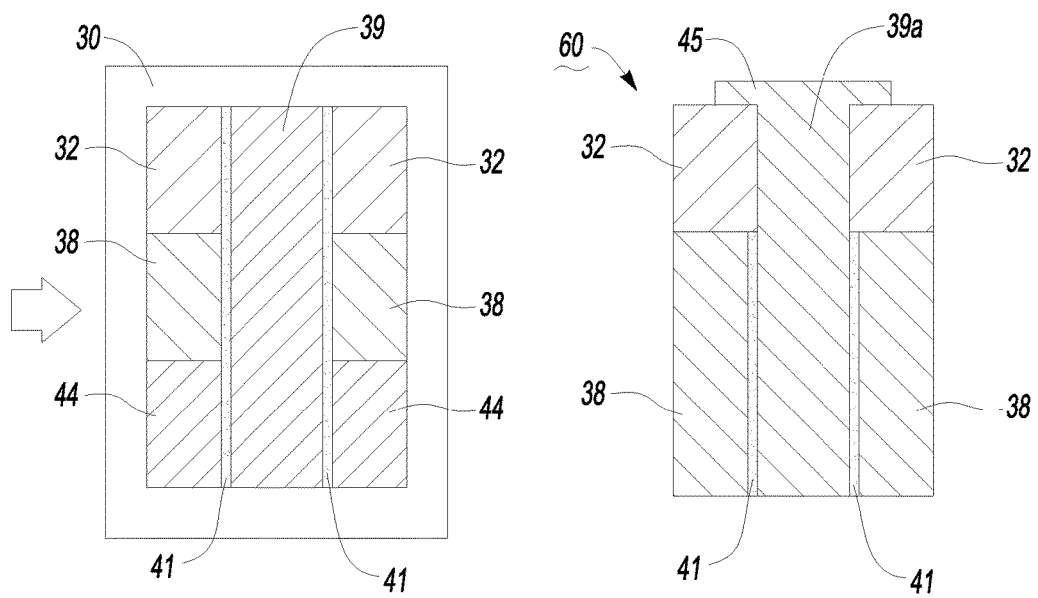
*Fig-2C*    *Fig-3*

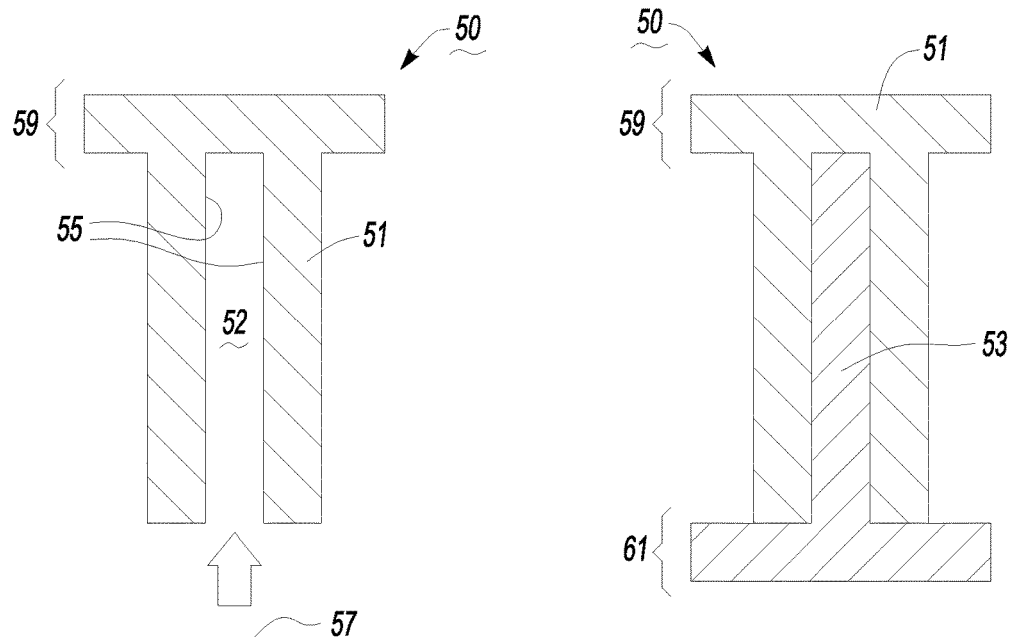
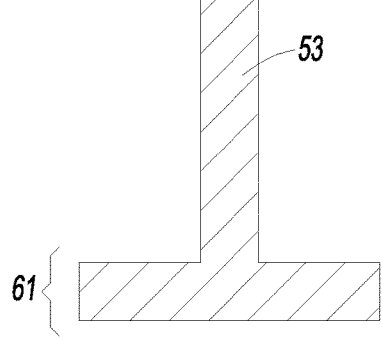
Fig-4A
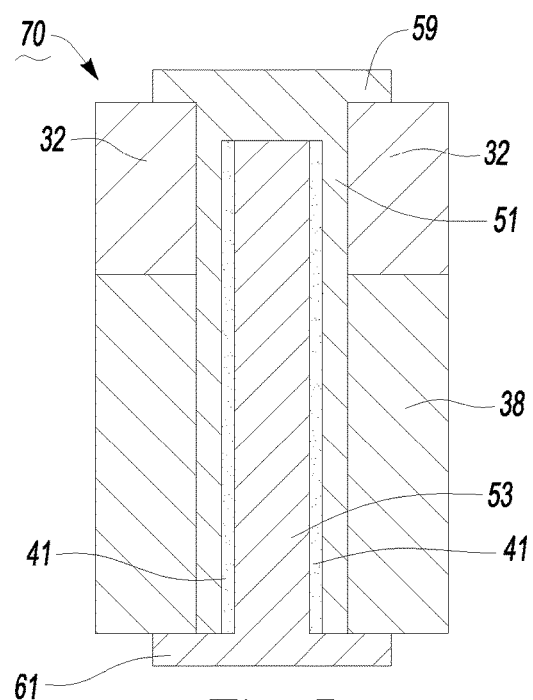

METHODS OF JOINING COMPONENTS IN VEHICLE ASSEMBLIES

FIELD

The present disclosure relates to methods of joining components to form vehicle assemblies, such as engine assemblies, by using at least one polymeric composite pin to join the components together.

BACKGROUND

This section provides background information related to the present disclosure which is not necessarily prior art.

Traditionally, engine components for automotive applications have been made of metals, such as steel and iron. Metals components are robust, typically having good ductility, durability, strength and impact resistance. While metals have performed as acceptable engine components, they have a distinct disadvantage in being heavy and reducing gravimetric efficiency, performance and power of a vehicle thereby reducing fuel economy of the vehicle.

Weight reduction for increased fuel economy in vehicles has spurred the use of various lightweight metal components, such as aluminum and magnesium alloys as well as use of light-weight reinforced composite materials. While use of such lightweight materials can serve to reduce overall weight and generally may improve fuel efficiency, issues can arise when using such materials in an engine assembly due to high operating temperatures associated with the engine assembly. For example, the lightweight metal components can also have relatively high linear coefficients of thermal expansion, as compared to traditional steel or ceramic materials. In engine assemblies, the use of such lightweight metals can cause uneven thermal expansion under certain thermal operating conditions relative to adjacent components having lower linear coefficients of thermal expansion, like steel or ceramic materials, resulting in separation of components and decreased performance. Additionally, lightweight reinforced composite materials may have strength limitations, such as diminished tensile strength, and they can degrade after continuous exposure to high temperatures. Thus, lightweight engine assemblies having increased durability under high temperature operating conditions along with enhanced methods of heat transfer (e.g., heating and cooling) for such engine assemblies are needed to further improve efficiency of operation and fuel economy. However, manufacturing such lightweight engine assemblies which have a combination of lightweight materials and traditional materials can be challenging, particularly, with respect to fastening polymeric composite components with metal components.

Typically, primary engine assembly components, such as a cylinder head, cylinder housing, and crank housing, are joined together via a plurality of threaded metal fasteners (e.g., bolts). However, use of such traditional threaded metal fasteners can prove problematic when one or more of the engine components comprises a polymeric composite material. More specifically, the polymeric composite material usually comprises an arrangement of fibers and forming a channel, particularly a threaded channel, for receiving at least one of the threaded metal fastener can cause the fibers to break and/or fray in the polymeric composite resulting in compromised structural integrity of the polymeric composite component. Additionally, traditional metal fasteners and polymeric composite components when used together can undergo uneven thermal expansion under certain thermal operating conditions due to the difference in linear coefficients of thermal expansion between the materials. As known in the art, uneven thermal expansion can cause spin loss and thus diminish performance and fuel efficiency of the engine assembly. Therefore, methods of joining a combination of material components, particularly polymeric composite components, to form lightweight engine assemblies without diminishing structural integrity of the components are needed.

SUMMARY

This section provides a general summary of the disclosure, and is not a comprehensive disclosure of its full scope or all of its features.

In certain aspects, the present disclosure provides a method for joining components to form an assembly for a vehicle. The method may comprise arranging a first component in a mold, wherein the first component defines a first channel therein; arranging a second component in the mold, wherein the second component defines a second channel therein; substantially aligning the first channel with the second channel to define a pin-receiving channel capable of receiving a polymeric composite pin; and inserting at least one polymeric composite pin comprising a polymer and a plurality of reinforcing fibers into the pin-receiving channel thereby joining the first component with the second component. An adhesive may be disposed adjacent to at least a portion of the at least one polymeric composite pin.

In other aspects, the present disclosure provides a method for joining components in an engine assembly. The method may comprise arranging at least a first component in a mold, wherein the first component defines a first channel therein; arranging a second component in the mold, wherein the second component defines a second channel; substantially aligning the first channel with the second channel to define a pin-receiving channel; and inserting at least one polymeric composite pin comprising a polymer and a plurality of reinforcing fibers into the pin-receiving channel thereby joining the first component with the second component. An adhesive may be disposed adjacent to at least a portion of the at least one polymeric composite pin. The first component and the second component may be selected from the group consisting of a cylinder head, a cylinder housing, a crank housing, turbocharger, air conditioner, water pump, exhaust manifold, intake manifold, cam cover, engine cover and oil pan. At least one of the first component and the second component may comprise a polymeric composite material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1a-1d show cross-sectional schematics illustrating joining together of components to form a vehicle assembly according to certain aspects of the present disclosure.

FIGS. 2a-2c show cross-sectional schematics illustrating an alternative joining together of components to form a vehicle assembly according to certain aspects of the present disclosure.

FIG. 3 shows a cross-sectional view of an alternative vehicle assembly joined together according to certain aspects of the present disclosure.

FIGS. 4a and 4b show a cross-sectional view of an alternative polymeric composite pin according to certain aspects of the present disclosure.

FIG. 5 shows a cross-sectional view of an alternative vehicle assembly joined together according to certain aspects of the present disclosure.

Corresponding reference numerals indicate corresponding parts throughout the several views of the drawings.

DETAILED DESCRIPTION

Figure 6A:
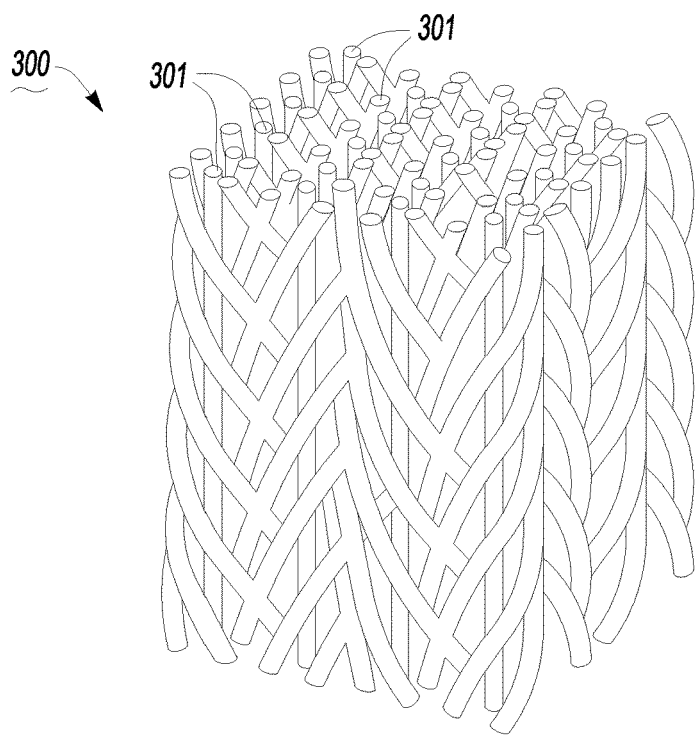
FIGS. 6a and 6b show a detailed view of polymeric fiber composite pins formed of braided reinforcing fibers.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "attached to" or "coupled to" another element or layer, it may be directly on, engaged, connected, attached or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," and the like). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In a vehicle, such as an automobile, an engine is a power source that produces torque for propulsion. The engine is an assembly of parts, including cylinder liners, pistons, crankshafts, combustion chambers, and the like. In a four stroke internal combustion engine each piston has an intake stroke, a compression stroke, a power stroke, and an exhaust stroke. During the intake stroke, a piston moves downward and an inlet valve is opened to permit a gaseous air mixture to fill a combustion chamber. During the compression stroke, intake and exhaust valves are closed and the piston moves upward to compress the gaseous air mixture. During the power stroke, the gaseous air mixture in the combustion chamber is ignited by a spark plug and the rapidly expanding combustion gases drive the piston downward. During the exhaust stroke, the exhaust valve is opened and the piston moves upward to discharge the combustion gases (exhaust gases). Overall, during internal combustion, the engine components may be subjected to varying amounts of stresses as well as varying temperatures due to the exothermic combustion reactions occurring in the engine block.

As discussed above, as weight of engine components increases, power, fuel economy, and efficiency may decrease. Thus, it is desirable to include various lightweight components, such as lightweight metals and lightweight composite materials, in engine assemblies instead of the traditional steel and/or iron components to decrease weight of the engine but also to maintain structural integrity of the engine.

Thus, methods for joining components to form assemblies for vehicles, such as engine assemblies, are provided herein which include use of a combination of components formed of lightweight materials and traditional materials. Advantageously, the methods described herein can join together a combination of material components, particularly polymeric composite components, to form lightweight engine assemblies without diminishing structural integrity of the individual components. Further, such methods may result in vehicle assemblies (e.g., engine assemblies) with improvements in noise, vibration and harshness. While the methods described herein are particularly suitable for manufacturing components of an automobile or other vehicle, they may also be used in a variety of other industries and applications, including aerospace components, consumer goods, office equipment and furniture, construction, industrial equipment and machinery, farm equipment, or heavy machinery, by way of non-limiting example. Non-limiting examples of vehicles that can be manufactured by the current technology include automobiles, tractors, buses, motorcycles, boats, mobile homes, campers, aircrafts (manned and unmanned), and tanks. Other exemplary structures that have frames that can be manufactured by the current technology include buildings, such as houses, offices, sheds, warehouses, and devices.

In particular, methods for joining components to form an assembly for a vehicle are provided herein. For example, as best shown in FIG. 1a, the method may comprise arranging at least a first component 32, e.g., in a mold 30, wherein the first component 32 defines a first channel 33 therein which extends from a first exterior surface 34 to an opposing second exterior surface 36 of the first component 32. The method further comprises arranging a second component 38, e.g., in the mold 30, wherein the second component 38 defines a second channel 35 therein which extends from a third exterior surface 40 to an opposing fourth exterior surface 42 of the second component 38, as shown in FIG. 1b. The components may be held together, e.g., by a jig (not shown). Alternatively, it is contemplated herein, that instead of completely extending from an exterior surface (e.g., exterior surface 34) to an opposing exterior surface (e.g., exterior surface 40), the first channel 33, the second channel 35, etc, may extend partially from an exterior surface (e.g., exterior surfaces 34, 36) or may extend partially from an opposing exterior surface (e.g., exterior surfaces 40, 42), so long as the first channel and the second channel may be aligned to form a pin-receiving channel. The first channel 33 may be substantially aligned with the second channel 35 to define a pin-receiving channel 37, as shown in FIG. 1c, where the second exterior surface 36 of the first component 32 is adjacent to the third exterior surface 40 of the second component 38. The pin-receiving channel 37 may be capable of receiving a polymeric composite pin. The method further comprises inserting at least one polymeric composite pin 39 into the pin receiving channel thereby joining the first component 32 with the second component 38 to form assembly 40, as shown in FIG. 1d. Additionally or alternatively, an adhesive 41 may be disposed adjacent to at least a portion of the at least one polymeric composite pin 39. Any suitable polymer-based adhesive may be used. Non-limiting examples of the adhesive include epoxy, polyurethane, silicones (e.g., polydimethylsiloxane (PDMS), cyanoacrylate, polyvinylacetate. The adhesive 41 may be applied to at least a portion of the surface 29 of the first component 32 and/or the second component 38, which define the pin-receiving channel 37 prior to insertion of the polymeric composite pin 39. Preferably, the adhesive 41 is applied to substantially the entire surface 31 of the first component 32 and the second component 38, which define of the pin-receiving channel 37. Additionally or alternatively, the adhesive 41 may be applied to the exterior surface of the polymeric composite pin 39 prior to insertion into the pin-receiving channel 37. Advantageously, when the polymeric composite pin 39 and the first component 32 and/or the second component 38 are a different material (e.g., metal) than the polymeric composite pin 39 such that there is a difference in coefficients of thermal expansion between the polymeric composite pin 39 and the first component 32 and/or second component 38, the adhesive 41 can prevent separation between the polymeric composite pin 39, the first component 32 and/or the second component 38 in the event of uneven thermal expansion. In certain other variations, the present disclosure contemplates a polymeric composite pin 39 as described herein.

In certain variations, as shown in FIG. 2a, the method may further comprise arranging a third component 44, e.g., in the mold 30, along with the first component 32 and the second component 38. The third component 44 defines a third channel 47, which may extend from a fifth exterior surface 46 to an opposing sixth exterior surface 48 of the third component 44. The first channel 33 may be substantially aligned with the second channel 35 and the third channel 47 to define a pin-receiving channel 43, as shown in FIG. 2b, where the second exterior surface 36 of the first component 32 is adjacent to the third exterior surface 40 of the second component 38 and the fourth exterior surface 42 of the second component 38 is adjacent to the fifth exterior surface 46 of the third component 44. Alternatively, the third component 44 may be arranged (not shown) to be adjacent to the first component 32 such that the sixth exterior surface 48 of the third component 44 is adjacent to the first exterior surface 34 of the first component 32. The polymeric composite pin 39 may be inserted into the pin-receiving channel 43 thereby joining the first component 32, the second component 38 and the third component 44 to form joined assembly 80, as shown in FIG. 2c. The method may further comprise applying an adhesive 41 to at least a portion of a surface 31 of the first component 32, the second component 38, and the third component 44, which define the pin-receiving channel 43 prior to insertion of the polymeric composite pin 39. As will be appreciated by one skilled in the art, the methods described herein contemplate arranging more than three components to form a vehicle assembly as well as arranging a plurality of polymeric composite pins as described herein. For, example, a plurality of components, e.g., at least about four components, at least about five components, at least about six components, at least about seven components, at least about eight components, at least about nine components or at least about ten components, with respective channels defined therein may be arranged and joined together via a plurality of polymeric composite pins by the methods described herein.

In certain variations, a polymeric composite pin 39a may further comprise a cap portion 45 disposed at least at one terminal surface of the polymeric composite pin 39a, as shown in alternative joined assembly 60 in FIG. 3. The cap portion 45 is particularly advantageous when the first component 32 defines a first channel having a smaller surface area for applying the adhesive 41 to bond with the polymeric composite pin 39a and to further improve the bond between the polymeric composite pin 39a with the first component 32, the cap portion 45 is present thereby improving the overall joining of the first component 32 with the second component 38. In such instances, as shown in FIG. 3, adhesive 41 is only present on a surface of the second component 38 such that adhesive 41 is disposed between the polymeric composite pin 39a and the second component 38. Further, the cap portion 45 is also advantageous if the first component 32 and the second component 38 are formed of different materials (e.g., metal, polymeric composite) having different coefficients of thermal expansion. In such instance, the cap portion 45 can prevent separation between the first component 32 and the second component 38 in the event of uneven thermal expansion. Alternatively, the polymeric composite pin 39a may comprise a cap portion disposed at two terminal surfaces of the polymeric composite pin 39a (not shown). In certain variations, the present disclosure contemplates a polymeric composite pin 39a as described herein comprising at least one cap portion 45 as described herein.

In certain other variations, as shown in FIGS. 4a and 4b, a polymeric composite pin 50 can comprise an outer pin portion 51 and an inner pin portion 53. The outer pin portion 51 has an aperture 52 defined therein for receiving the inner pin portion 53. In such instances, the inserting of the least one polymeric composite pin into the pin receiving channel may comprise inserting the outer pin portion 51 into the pin-receiving channel and inserting the inner pin portion 53 into the aperture defined in the outer pin portion to join the first component 32 and second component 38 to form joined assembly 70, as shown in FIG. 5. An adhesive 41 may be adjacent to outer pin portion 51 and the inner pin portion 53. In certain variations, the adhesive 41 may be applied to at least a portion of a surface 55 of the outer pin portion 51, which defines the aperture 52, and/or at least a portion of a surface 57 of the inner pin portion 53 such that adhesive 41 is adjacent to the outer pin portion 51 and the inner pin portion 53. Additionally or alternatively, the adhesive 41 may be applied to at least a surface the first component 32 and the second component 38, which define the pin-receiving channel. As shown in FIGS. 4a and 4b, the outer pin portion 51 and the inner pin portion 53 may include cap portions 59 and 61 at two terminal ends of the polymeric composite pin 50. Alternatively, only outer pin portion 51 or inner pin portion 53 may include a cap portion (not shown). In certain variations, the present disclosures contemplates a polymeric composite pin 50 as described herein comprising an outer pin portion 51 as described herein and an inner pin portion 53 as described herein.

Additionally or alternatively, the method may further comprise applying a preload to the various components (e.g., the first component, the second component, the third component, etc.). For example, a preload may be applied after the first component and the second component are arranged and aligned to form the pin-receiving channel. Once the preload is applied, the at least one polymeric composite pin may be inserted and adhered to join the components together.

The pin described herein is a polymeric composite material, which comprises a polymer and a plurality of reinforcing fibers. Examples of suitable polymers include, but are not limited to a thermoset, a thermoplastic resin, elastomer and combination thereof. Preferable polymers include, but are not limited to epoxies, phenolics, vinylesters, bismaleimides, polyether ether ketone (PEEK), polyamides, polyimides and polyamideimides. Examples of suitable reinforcing fibers include, but are not limited to carbon fibers, glass fibers, aramid fibers, polyethylene fibers, organic fibers, metallic fibers, and combinations thereof. In particular, the reinforcing fibers are glass fibers and/or carbon fibers. The reinforcing fibers may be continuous fibers or discontinuous fibers. In particular, the reinforcing fibers are continuous fibers. Advantageously, the polymeric composite pin described herein may have a tensile strength of about 100 MPa to about 4000 MPa, about 500 MPa to about 3000 MPa or about 1000 MPa to about 2000 MPa.

Figure 6B:
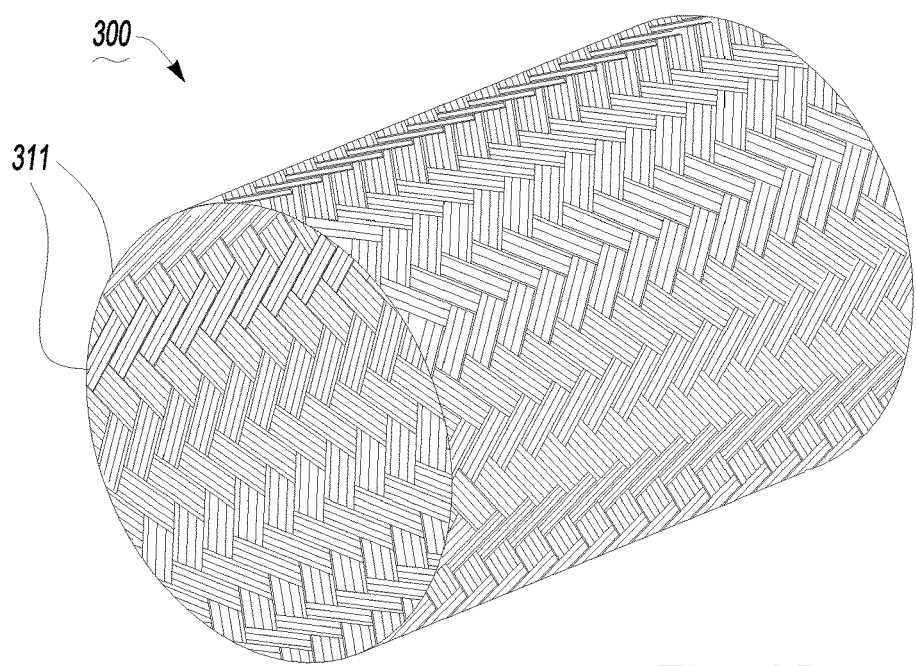

Polymeric composites can be formed by using strips of the composite precursor material, such as a fiber-based material (e.g., cloth or graphite tape). The composite may be formed with one or more layers, where each layer can be formed from contacting and/or overlapping strips of the fiber-based material. In particular, the polymeric composite pin 39 may comprise one or more layers, where each layer can be formed from contacting and/or overlapping reinforcing fibers to form an interwoven preform of reinforcing fibers. The reinforcing fibers may be formed into a shape of a rod or a tube to form the polymeric composite pin. For example, a detailed view of a polymeric composite pin 300 is shown in FIG. 6a where reinforcing fibers 301 (e.g., carbon fibers, glass fibers) are woven or braided to form the polymeric composite pin 300. Alternatively, a polymeric composite pin 310 can comprise braided reinforcing fibers 311 in the shape of a tube or rod with a hollow interior, as shown FIG. 6b. It should be noted that other weaving patterns are also contemplated and not limited to the patterns shown in FIGS. 6a-6b, which are merely example embodiments. Alternatively, the polymeric composite pin can be formed of reinforcing fibers arranged in a unidirectional manner where substantially all of the reinforcing fibers are arranged in one directional length to form the pin.

The fiber-based substrate material (e.g., reinforcing fibers) may also comprise a resin (e.g., a polymer). The resin can be solidified (e.g., cured or reacted) and thus can serve to bond single or multiple layers together in the polymeric composite. Various methods are typically employed for introducing resin to impregnated fiber-based substrate composite material systems: wet winding (or layup), pre-impregnating (referred to as "pre-preg"), pultrusion, and resin transfer molding. For wet winding, a dry fiber reinforcement material can be wetted with the resin as it is used, usually by submersion through a bath. For pre-impregnating (pre-preg), the resin is wetted into the fiber-based material in advance, and usually includes a step of partially curing the resin to have a viscous or tacky consistency (also known as a B-stage partial cure), and then winding up the pre-preg fiber-based material for later use. Pre-preg composite material systems tend to use thermoset resin systems, which can be cured or reacted by elevated temperatures with cure times or reaction time ranging from about 1 minute to about 2 hours (depending on the cure or reaction temperatures). However, some pre-preg materials may employ resins that cure or react with actinic radiation (e.g., ultraviolet radiation (UV)). For pultrusion, resin may be applied to the fiber reinforcement material and the reinforcement material with the resin may be pulled through a heated or a cooled die to form the desired shape (e.g., the polymeric composite pin). For resin transfer molding, dry fiber reinforcement material may be placed into a mold and resin may be infused into the mold under pressure (e.g., about 10 psi to about 2000 psi). Injection molding techniques known in the art may also be used to introduce resin into the reinforcement material, particularly where the reinforcement material comprise discontinuous fibers. For example, a precursor comprising a resin and the reinforcement material may be injected or infused into a defined space or mold followed by solidification of the precursor to form the polymeric composite material. The term "injection molding" also includes reaction injection molding using at thermoset resin.

The polymeric composite pin may have a substantially round cross-section. As understood herein, "substantially round" may include circular and oval cross-sections and the dimensions of the cross-section may deviate in some aspects. The polymeric composite pin may have a diameter of about 50 µm to about 5,000 µm, about 100 µm to about 3,000 µm, about 100 µm to about 1,000 µm, about 100 µm to about 500 µm. Additionally or alternatively, the polymeric composite pin may have a substantially rectangular cross-section. As understood herein, "substantially rectangular" may include square cross-sections and the dimensions of the cross-section may deviate in some aspects. Other cross-sections of the polymeric composite pin contemplated herein include, but are not limited to triangular cross-section, pentagonal cross-section, hexagonal cross-section, octagonal cross-section, and the like.

The first component, the second component, and the third component may be metal (e.g. steel, iron, magnesium alloy, aluminum alloy, metal composite), ceramic (e.g., alumina, silicon carbide, ceramic composite) or a polymeric composite material as described herein. In particular, at least one of the first component, the second component, and the third component comprise a polymeric composite material as described herein. In certain aspects, the first component is a metal material as described herein or a ceramic material as described herein and the second component and/or the third components are a polymeric composite material as described herein.

The first, second and third components may be any suitable component of a vehicle assembly. Non-limiting examples of first, second and third components include a cylinder head, a housing, a housing (e.g., a cylinder housing, a crank housing), a liner defining a cylindrical region for receiving a piston, a piston, a crankshaft, a connecting rod, a bulkhead, a turbocharger, air conditioner, water pump, exhaust manifold, intake manifold, cam cover, engine cover and oil pan, and combinations thereof. In certain variations, the first component and the second component are selected from the group consisting of a cylinder head and a housing. The housing may be a cylinder housing or a crank housing. In other certain variations, the first component may be a cylinder head, the second component may be a cylinder housing and the third component may be a crank housing.

Figure 7:
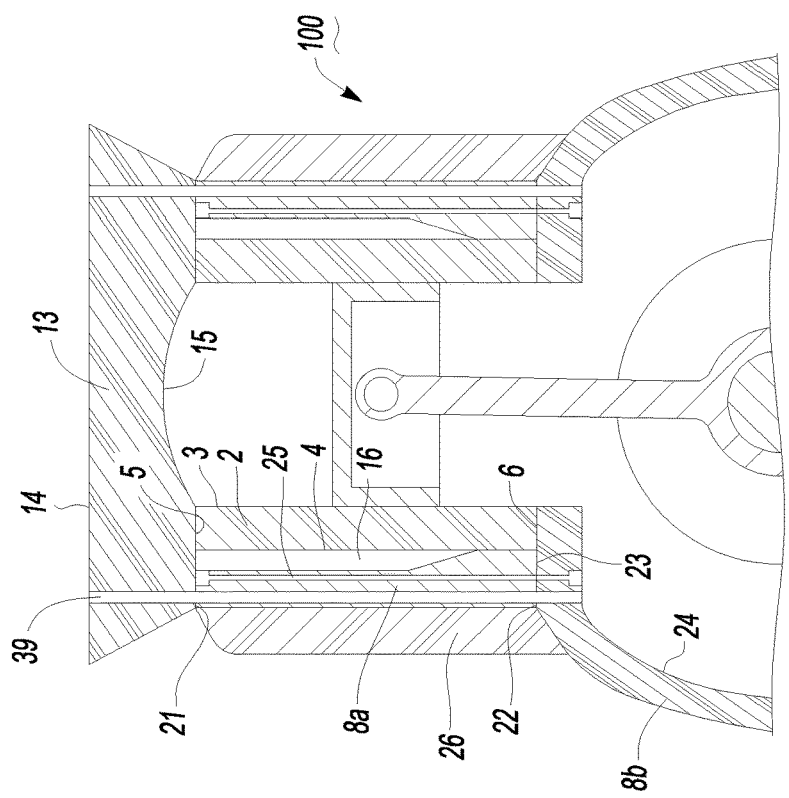
FIG. 7 shows a cross-sectional view of a vehicle assembly joined together according to certain aspects of the present disclosure.

The methods described herein may be used to fasten various components of a vehicle assembly (e.g., engine assembly). For example, as best shown in FIG. 7, the methods described herein may be used to join together the components of an engine assembly 1 (e.g., for use in a vehicle). The engine assembly 1 includes a liner 2, which defines an open void cylindrical region 7. The liner 2 may be any suitable material, such as but not limited to metal (e.g. steel, iron, magnesium alloy, aluminum alloy, metal composite) or ceramic (e.g., alumina, silicon carbide, ceramic composite). In certain variations, the liner 2 is a metal material. The liner 2 generally may be cylindrically shaped and have hollow interior. The liner 2 has an interior surface 3, an opposing exterior surface 4, a first terminal surface 5 and an opposing second terminal surface 6. The engine assembly 1 also includes a housing 8 disposed around at least a portion of the exterior surface 4 of the liner 2. The housing 8 may also be adjacent to the second terminal surface 6 of the liner 2. The housing 8 has an interior surface 9, an opposing exterior surface 10, a third terminal surface 11, and an opposing fourth terminal surface 12. The housing 8 may be a lightweight metal (e.g., aluminum alloy, magnesium alloy), a ceramic material (e.g., alumina, silicon carbide) or a polymeric composite material. A layer of polymeric composite (e.g., comprising discontinuous fibers) (not shown) may also be present between the exterior surface 4 of the liner 2 and the interior surface 9 of the housing 8.

The engine assembly 1 may further include a cylinder head 13 having a fifth terminal surface 14 and an opposing sixth terminal surface 15. At least a portion of the sixth terminal surface 15 may be adjacent to the first terminal surface 5 of the liner 2. The cylinder head 13 may be any suitable material, metal (e.g. steel, iron, magnesium alloy, aluminum alloy, metal composite), ceramic (e.g., alumina, silicon carbide, ceramic composite) or a polymeric composite material as described herein. In certain variations, the cylinder head 13 is a metal material. The liner 2 may be held in place by its contact with the cylinder head 13 and housing 8. A coolant channel 16 may be defined between at least a portion of the exterior surface 4 of the liner 2, an interior surface 9 of the housing 8 and the sixth terminal surface 15 of the cylinder head 13. If more than one liner is present, there may be a continuous coolant channel 16 adjacent to each liner or there may be discrete coolant channels corresponding to each liner. The coolant channel 16 is capable of receiving a suitable heat transfer fluid for cooling a vehicle assembly (e.g., engine assembly). Examples of suitable heat transfer fluids include, but are not limited to, air, water, oil, ethylene glycol, propylene glycol, glycerol, methanol, and combinations thereof. The air may be supplied from an air conditioning system or produced from movement of the vehicle. The heat transfer fluid may be supplied by at least one pump (not shown) from at least one supply reservoir or supply channel (not shown) to at least one inlet (not shown) in the coolant channel 16. The pump and supply reservoir may be present adjacent to the engine assembly. Optionally, the heat transfer fluid may flow through a cooler (not shown) to further reduce the temperature of the heat transfer fluid or the heat transfer fluid may flow through a heater (not shown) to increase the temperature of the heat transfer fluid. One of ordinary skill in the art appreciates that the heat transfer fluid may be supplied to one or more coolant channels as necessary.

The cylinder head 13, housing 8 and/or liner 2 are joined together via the methods described herein by at least one polymeric composite pin 39 as described herein. For example, a plurality of polymeric composite pins 39 may join together the cylinder head 13 (e.g., a first component) and the housing 8 (e.g., a second component). Additionally or alternatively, a suitable sealant (not shown) and/or gasket (not shown) may be present between at least a portion of the sixth terminal surface 15 of the cylinder head 13, at least a portion of the first terminal surface 5 of the liner 2, and/or a least a portion of the third terminal surface 11 of the housing 8.

The cylindrical region 7 defined by the liner 2 may receive a piston 18. The piston 18 is connected to a crankshaft 20 via a connecting rod 19. The piston 18, connecting rod 19, and the crankshaft 20 may be any suitable material, e.g., metal, ceramic, polymeric composite, and combinations thereof. As will be appreciated by those of skill in the art, the engine assembly 1 shown in FIG. 7 depicts a single piston 18 and single cylindrical region 7 and associated componentry, but may in fact include a plurality of pistons, cylindrical regions 7, plurality of polymeric composite pins 39 and associated components described above.

Figure 8:
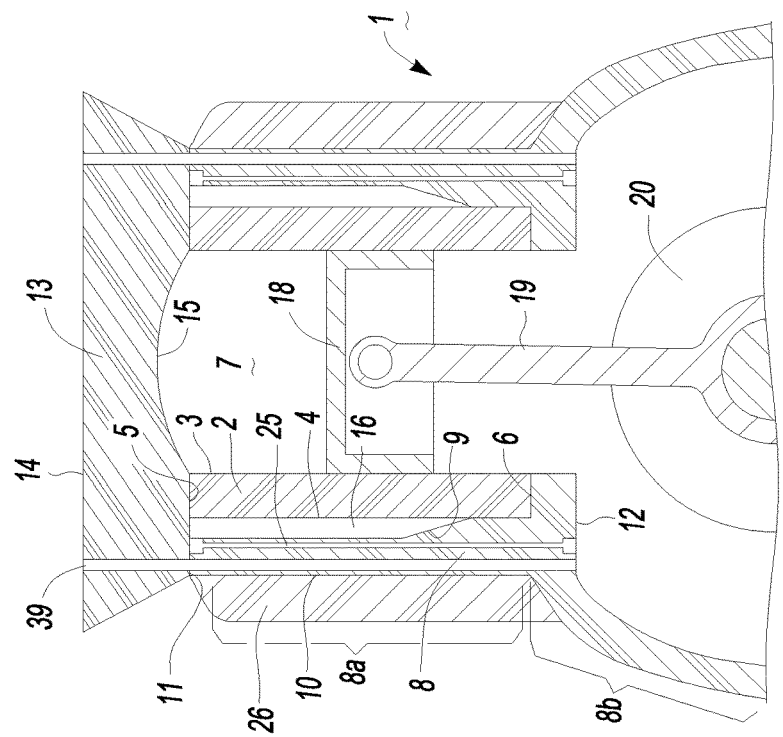
FIG. 8 shows an alternative cross-sectional view of a vehicle assembly joined together according to certain aspects of the present disclosure.

In various embodiments, the housing 8 comprises a cylinder housing portion 8a and crank housing portion 8b. The cylinder housing portion 8a and the crank housing portion 8b may be integrally formed, as shown in FIG. 7. Alternatively, as shown in FIG. 8, the cylinder housing portion 8a and the cranking housing portion 8b may be distinct components joined together via an adhesive (not shown) or with a plurality of polymeric composite pins 39 in engine assembly 100. When present as distinct components, the cylinder housing portion 8a and the crank housing portion 8b may be the same or different material. With reference to FIG. 8, the cylinder housing portion 8a has a seventh terminal surface 21 and an opposing eighth terminal surface 22. The crank housing portion 8b has a ninth terminal surface 23 and an opposing tenth terminal surface 24. The ninth terminal surface 23 of the crank housing portion is adjacent to the second terminal surface 6 of the liner 2 and the eighth terminal surface 22 of the cylinder housing portion 8a. The seventh terminal surface 21 of the cylinder housing portion 8a may be adjacent to the sixth terminal surface 15 of the cylinder head 13. The cylinder head 13, cylinder housing portion 8a, the crank housing portion 8b, and/or liner 2 may be coupled together by any suitable fasteners as described herein. For example, a plurality of polymeric composite pins 39 may join together the cylinder head 13 (e.g., first component), the cylinder housing portion 8a (e.g., second component), and the crank housing portion 8b (e.g., third component). Additionally or alternatively, a suitable sealant (not shown) and/or gasket (not shown) may be present between at least a portion of the sixth terminal surface 15 of the cylinder head 13, at least a portion of the first terminal surface 5 of the liner 2, and/or a least a portion of the seventh terminal surface 21 of the cylinder housing portion 8a.

In certain aspects, the housing 8 is a polymeric composite material as described herein. In such instances, the housing 8 may comprise a suitable polymer and plurality of suitable reinforcing fibers. Examples of suitable polymers include, but are not limited to a thermoset resin, a thermoplastic resin, elastomer, and combination thereof. Preferable polymers include, but are not limited to epoxies, phenolics, vinylesters, bismaleimides, polyether ether ketone (PEEK), polyamides, polyimides and polyamideimides. Examples of suitable reinforcing fibers include, but are not limited to carbon fibers, glass fibers, aramid fibers, polyethylene fibers, ceramic fibers, organic fibers, metallic fibers, and combinations thereof. In particular, the reinforcing fibers are glass fibers and/or carbon fibers. The reinforcing fibers may be discontinuous fibers or continuous fibers. In particular, the reinforcing fibers are continuous fibers.

In order to heat and/or cool the engine assembly 1, the housing 8 (e.g., polymeric composite) can further include a plurality of microchannels 25, as shown in FIG. 7, for receiving a heat transfer fluid as described herein. The heat transfer fluid may be supplied by at least one pump (not shown) from at least one supply reservoir or supply channel (not shown) to at least one inlet (not shown) in the microchannels 205 in the vehicle assembly. The pump and supply reservoir may be present adjacent to the engine assembly. The heat transfer fluid may be at supplied at a suitable temperature to cool and/or heat the vehicle assembly, e.g., about 10° C. to about 120° C., about 20° C. to about 100° C. or about 20° C. to about 90° C. Optionally, the heat transfer fluid may flow through a cooler (not shown) to further reduce the temperature of the heat transfer fluid or the heat transfer fluid may flow through a heater (not shown) to increase the temperature of the heat transfer fluid.

The microchannels 25 may have a substantially round cross-section. As understood herein, "substantially round" may include circular and oval cross-sections and the dimensions of the cross-section may deviate in some aspects. The microchannels 25 may have a diameter of less than about 8,000 µm. Additionally or alternatively, the microchannels 25 have a diameter of about 0.1 µm to about 8,000 µm, 0.1 µm to about 5,000 µm, 0.1 µm to about 1,000 µm, about 1 µm to about 500 µm or about 1 µm to about 200 µm. Additionally or alternatively, the microchannels 25 may have a substantially rectangular cross-section. As understood herein, "substantially rectangular" may include square cross-sections and the dimensions of the cross-section may deviate in some aspects. Preferably, at least a portion of the microchannels 25 are interconnected, which may prevent blockages. The microchannels 25 may be oriented in any suitable direction, for example, axially, radially, spiral, branched, intersecting, criss-crossing and combinations thereof.

Figure 9A:
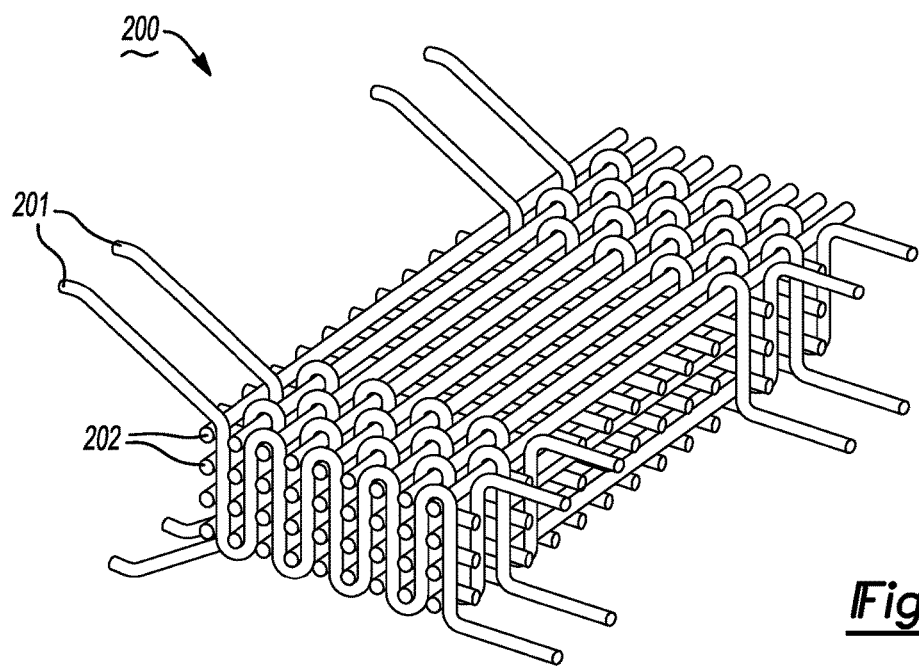
FIGS. 9a-9e show schematics illustrating formation of microchannels in a polymeric composite according to certain aspects of the present disclosure.
Figure 9B:
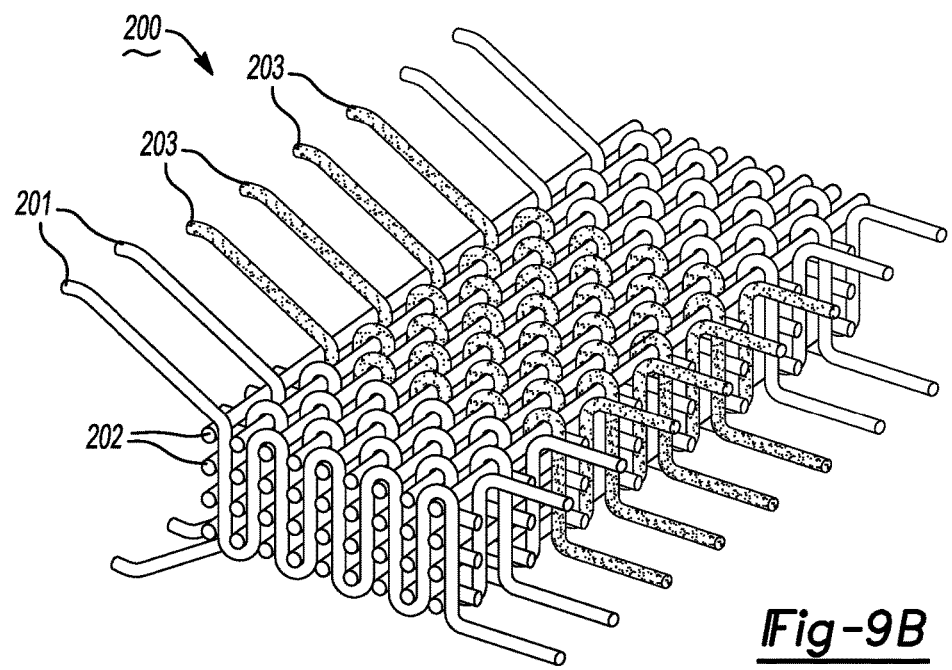

In certain other aspects, the present teaching also contemplates a process of using sacrificial fibers to form the microchannels 25 in the polymeric composite (e.g., housing 8). As shown in FIG. 9a, a composite woven preform 200 comprises interwoven first reinforcing fibers 201 (e.g., carbon fibers, glass fibers) and second reinforcing fibers 202 (e.g., carbon fibers, glass fibers) to form a three dimensional woven structure. The first reinforcing fibers 201 and the second reinforcing fibers 202 can be the same or different fibers. Sacrificial fibers 203 can be woven into the composite woven preform 200 along with the first reinforcing fibers 201, as shown in FIG. 9b. The first reinforcing fibers 201 and the sacrificial fibers 203 can be directed through the second reinforcing fibers 202 sinusoidally. It should be noted that other weaving patterns are also contemplated and not limited to the patterns shown in FIGS. 9a-9e, which are merely example embodiments. The sacrificial fibers 203 comprises a material, which can withstand weaving with the first reinforcing fibers 201 and/or the second reinforcing fibers 202 as well as solidification of the polymeric composite (e.g., resin infusion and curing or reacting), but is capable of volatilizing, melting dissolving or etching under conditions which do not substantially volatilize, melt, dissolve or etch other components of the polymeric composite (e.g., reinforcing fibers). Examples of suitable sacrificial fiber materials include, but are not limited to metals and polymers. Non-limiting metals may include solders, which comprise lead, tin, zinc, aluminum, suitable alloys and the like. Non-limiting polymers may include polyvinyl acetate, polylactic acid, polyethylene, polystyrene. Additionally or alternatively, the sacrificial fibers may further be treated with a catalyst or chemically modified to alter melting or degradation behavior.

Figure 9C:
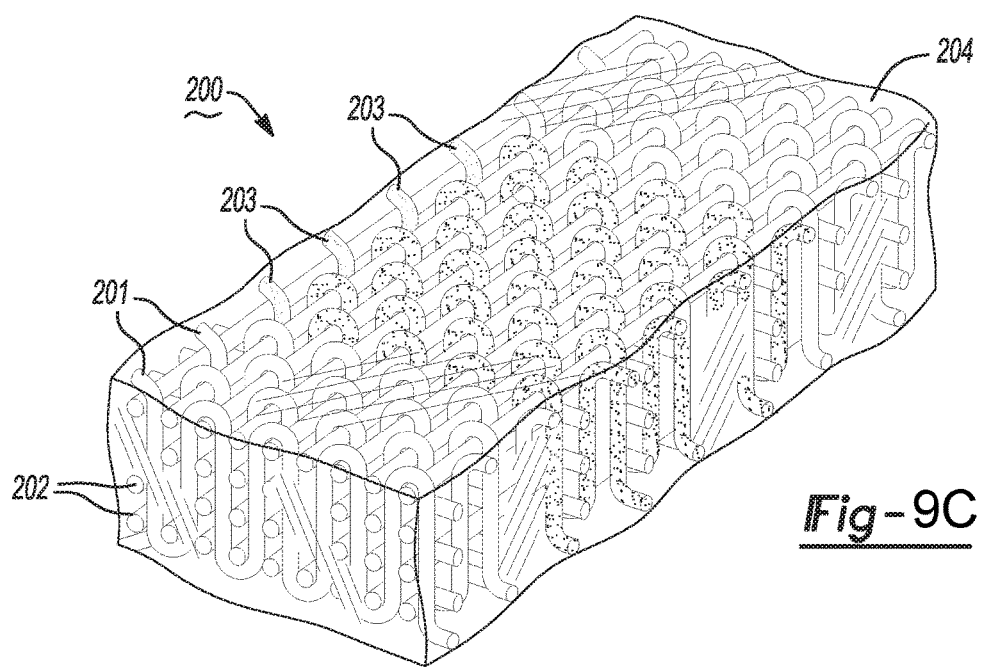
Figure 9D:
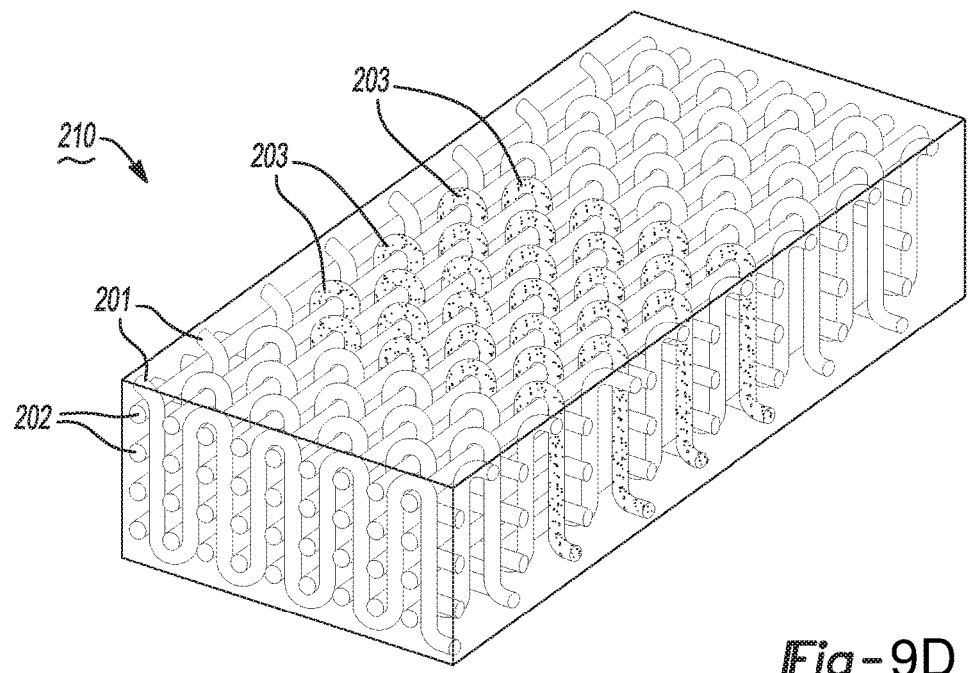
Figure 9E:
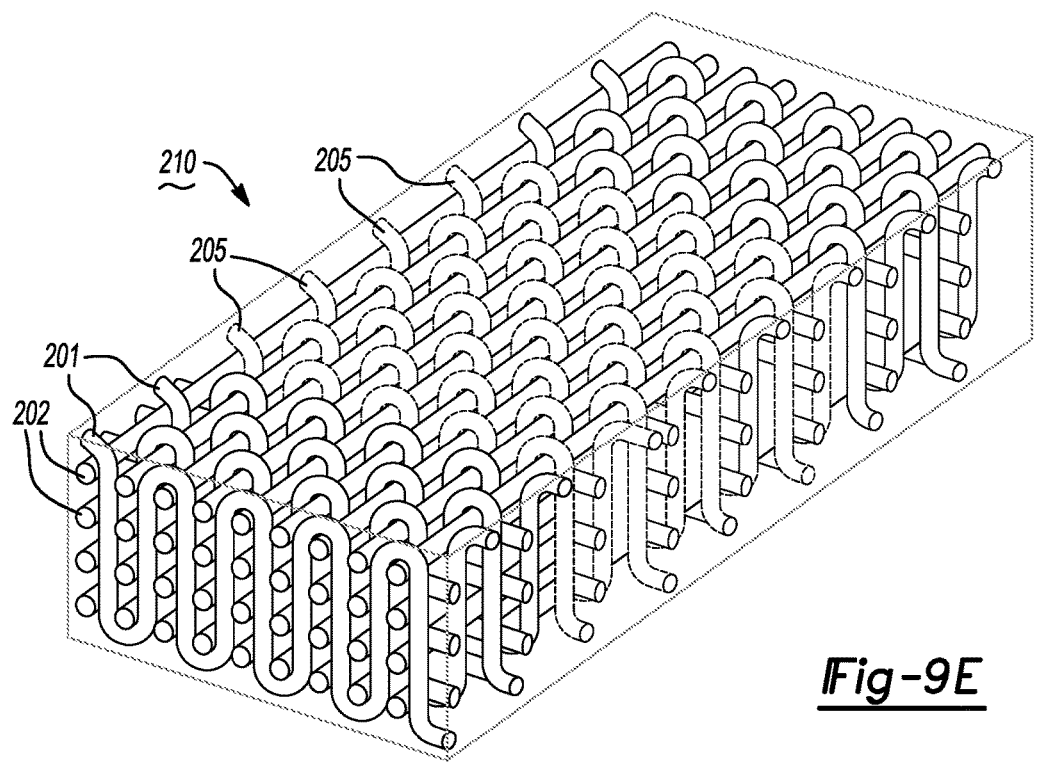

Following incorporation of the sacrificial fibers 203, a resin 204 is infused into the composite woven preform 200, which is then solidified (e.g., reacted or cured) under suitable conditions, as shown in FIGS. 9c and 9d, respectively, to form polymeric composite 210. After solidifying (e.g., reacting or curing), the polymeric composite 210 may be further treated (e.g., heated) to volatilize, melt, or degrade the sacrificial fibers 203 or the sacrificial fibers 203 may be dissolved to produce degradants. For example, the sacrificial fibers may be heated to a temperature (e.g., about 150° C. to about 200° C.) that substantially vaporizes or melts the sacrificial fibers but does not substantially degrade the reinforcing fibers and/or the cured resin. Any suitable solvent, such as, but not limited to acetone, may be applied to the sacrificial fibers to dissolve them, optionally with agitation, so long as the solvent does not substantially degrade or dissolve the reinforcing fibers and/or the cured resin. Alternatively, the sacrificial fibers may be etched using a suitable acid (e.g., hydrochloric acid, sulfuric acid, nitric acid, and the like). The degradants may be removed to form microchannels 205 (see FIG. 9e) in the polymeric composite 210, e.g., by applying a vacuum to the polymeric composite or introducing a gas to the polymeric composite to expel degradants out of the polymeric composite. It also contemplated herein that the microchannels may be present in a non-polymeric composite housing, for example, in a metal housing or a ceramic housing.

In other variations, a composite precursor material may be injection molded or otherwise applied to the opposing exterior surface 4 of liner 2, which may be followed by solidification (e.g., curing or reacting) to form the housing 8.

Additionally or alternatively, the polymeric composite (e.g., housing 8) may include a plurality of microspheres (not shown) for improved heat transfer. The microspheres may be ceramic or glass, and optionally, may be coated with a metal, ceramic and/or nanoparticles. Preferably, the coating has a high thermal conductivity, e.g., aluminum, copper, tin and the like. The microspheres may have a diameter of less than about 1,000 µm. Additionally or alternatively, the microspheres have a diameter of about 0.1 µm to about 1,000 µm, about 1 µm to about 500 µm or about 1 µm to about 200 µm.

Figure 10:
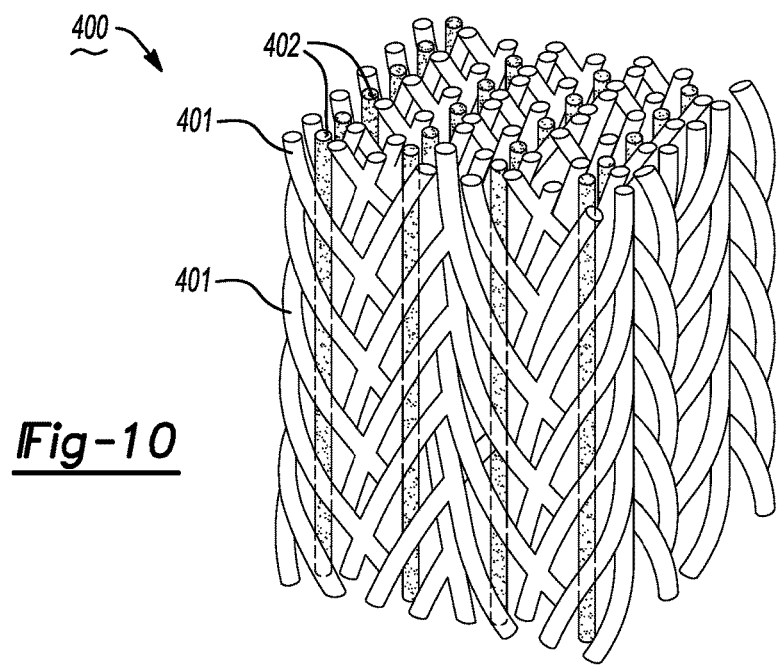
FIG. 10 shows a polymeric composite including reinforcing fibers and at least one wire.

Additionally or alternatively, the polymeric composite (e.g., housing 8) may include at least one wire for heating the engine assembly. For example, as shown in FIG. 10, one or more wires 402 may be incorporated or woven into reinforcing fibers 401 (e.g., carbon fibers) in the polymeric composite 400 (e.g., housing 8). The wires 402 may be comprise any material suitable for conducting electricity (e.g., copper, Nichrome, and the like). The wires 402 may be insulated from the reinforcing fibers 401. For example, the wires 402 may include a suitable insulative coating, such as a polymer coating and/or a braided glass fiber sheath. To heat the wires 402, electricity is provided by a battery or other suitable external source (not shown) and controlled by a control unit (not shown). Referring to FIG. 7, although not shown, a person of ordinary skill in the art appreciates that the wires 402 may be included in the housing 8 in addition to or instead of the plurality of microchannels 25.

In a particular embodiment, the polymeric composite housing comprises one or more of: (i) a plurality of microchannels as described herein; (ii) at least one wire as described herein; and (iii) a plurality of microspheres as described herein. Additionally or alternatively, the polymeric composite housing comprises two or more of (i), (ii) and (iii) (e.g., (i) and (ii), (i) and (iii), (ii) and (iii)). Additionally or alternatively, the polymeric composite housing comprises (i), (ii) and (iii).

Figure 11:
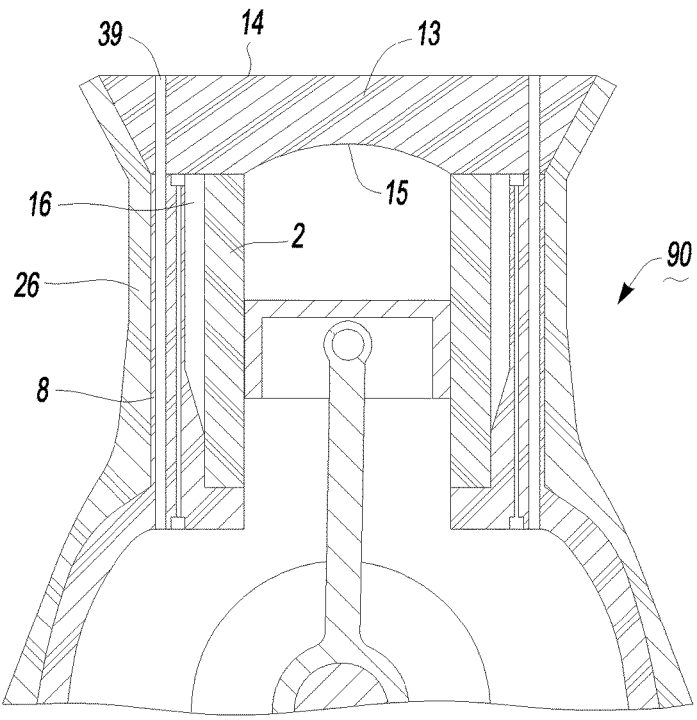
FIG. 11 shows an alternative cross-sectional view of a vehicle assembly joined together according to certain aspects of the present disclosure.

Referring back to FIG. 7, the engine assembly 1 may further include a polymeric composite layer 26 disposed around at least a portion of the exterior surface 10 of the housing 8. The polymeric composite layer 26 may serve as a mechanical, chemical and/or thermal shield for the engine assembly. The polymeric composite layer 26 may comprise a suitable polymer as described herein (e.g., thermoset resin, thermoplastic resin, elastomer) and a plurality of suitable reinforcing fibers (e.g., carbon fibers, glass fibers, aramid fibers, polyethylene fibers, ceramic fibers, organic fibers, metallic fibers, and combinations thereof). In particular, the reinforcing fibers are glass fibers and/or carbon fibers. The reinforcing fibers may be discontinuous fibers. The polymeric composite layer 26 may be formed by injection molding. Additionally or alternatively, the polymeric composite layer 26 may extend around at least a portion of the cylinder head 13, as shown in FIG. 11. Further, as shown in FIG. 11 in an alternative vehicle assembly 90, the polymeric composite layer 26 may extend along substantially all of the exterior surface 10 of the housing 8. Additionally or alternatively, the polymeric composite layer 26 may extend around any other suitable surface of the vehicle assembly, e.g., around an oil pan, around cam cover. Additionally or alternatively, the polymeric composite layer 26 may extend around any peripheral systems of the vehicle assembly, e.g., water pump, air conditioner, turbocharger. Alternatively, it is contemplated herein, that instead of utilizing a polymeric composite layer 26, a metal layer or ceramic layer may be used in its place. Such a polymeric composite layer 26, metal layer or ceramic layer may seal the outside of the engine assembly and prevent leakage of fluid from between the various components in the engine assembly and may avoid the need for the use of gaskets for sealing the engine assembly.

In other variations, polymeric composites used herein for the housing 8, the polymeric composite pin 39, and/or the polymeric composite layer 26 may be made by any other suitable methods known in the art, e.g., pultrusion, reaction injection molding, injection molding, compression molding, prepreg molding (in autoclave or as compression molding), resin transfer molding, and vacuum assisted resin transfer molding. Further, fiber precursors may be made by any other suitable methods known in the art, e.g., braiding, weaving, stitching, knitting, prepregging, hand-layup and robotic or hand placement of tows.

Figure 12A:
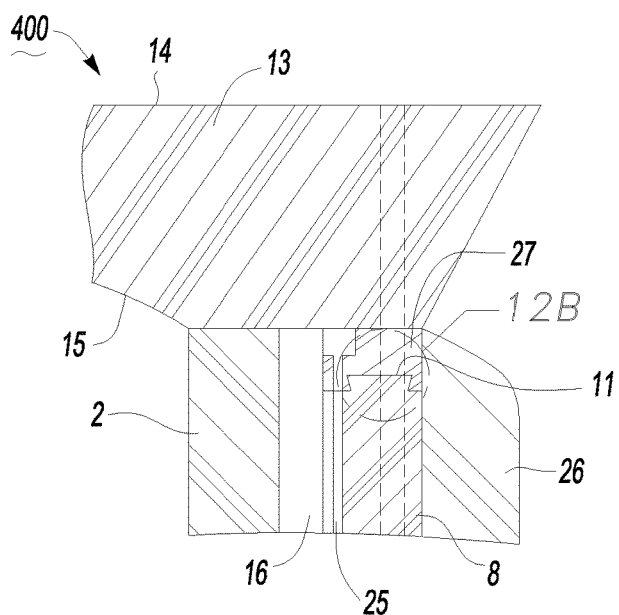
FIGS. 12a and 12b show an alternative cross-sectional view of a vehicle assembly joined together according to certain aspects of the present disclosure.
Figure 12B:
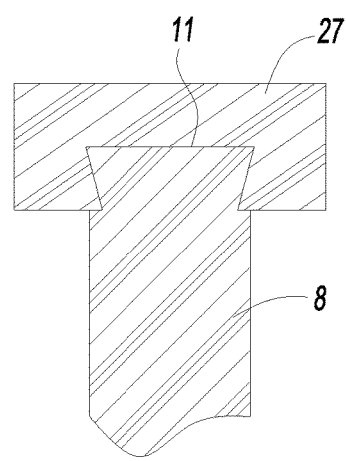

In various aspects, as shown in FIGS. 12a and 12b, an engine assembly 400 is contemplated, which includes a cap 27. The cap 27 may be adjacent to a third terminal surface 11 of the housing 8 and the sixth terminal surface 15 of the cylinder head 13. The cap 27 may be any suitable material, such as a metal, ceramic, or polymeric composite material. In particular, the cap 27 is metal (e.g., steel, iron, magnesium alloy, aluminum alloy), especially when the housing 8 is a polymeric composite because cap 27 may be more machinable than the polymeric composite. The cap 27 may serve as a mating surface between the cylinder head 13 and the housing 8. Preferably, the cap 27 and the liner 2 are the same material (e.g., metal) so that they may both be machined or formed together in preparation for a head gasket and/or the cylinder head 13. The cap 27 may be joined to the housing 8 with a suitable adhesive or directly molded with the housing 8. The cylinder head 13 (e.g., first component), the cap 27 (e.g., second component) and/or the housing 8 (e.g. third component) may be joined together via the methods described herein by a polymeric composite pin 39. Additionally or alternatively, a second cap (not shown) similar to the cap 27 may be adjacent to the eighth terminal surface 22 of the cylinder housing portion 8a and the ninth terminal surface 23 of the crank housing portion 8b.

Figures 13A, 13B:
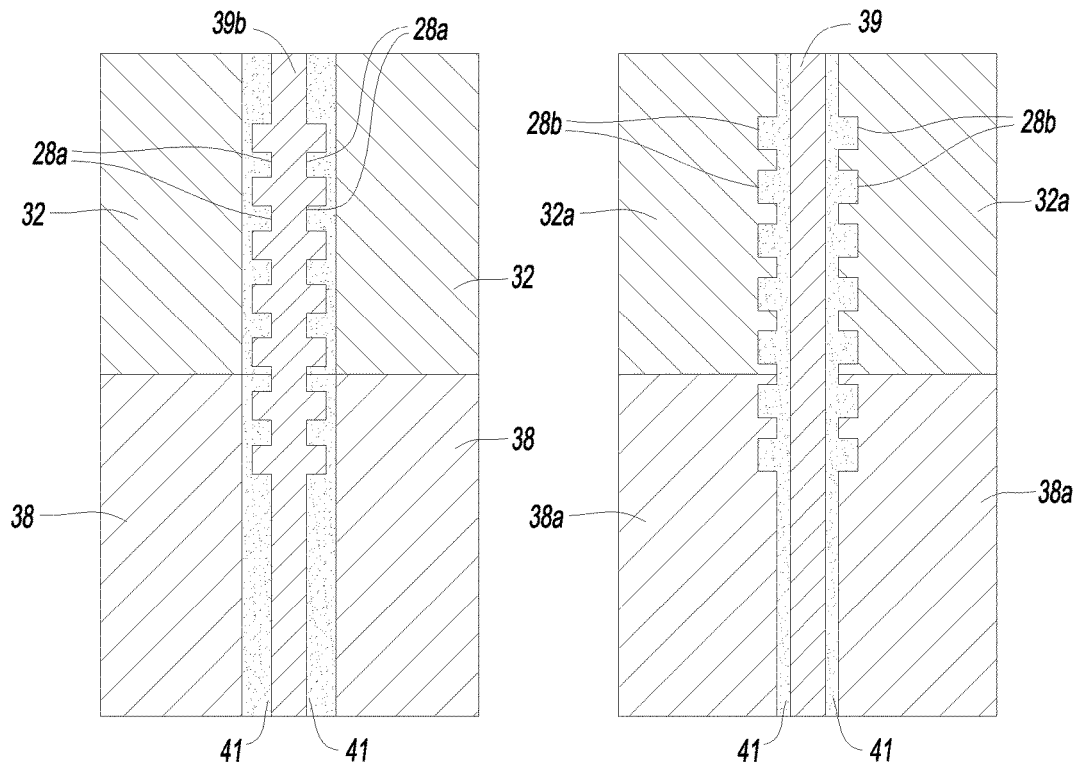
FIGS. 13a and 13b show alternative cross-sectional views of a vehicle assembly joined together according to certain aspects of the present disclosure.
Figure 14:
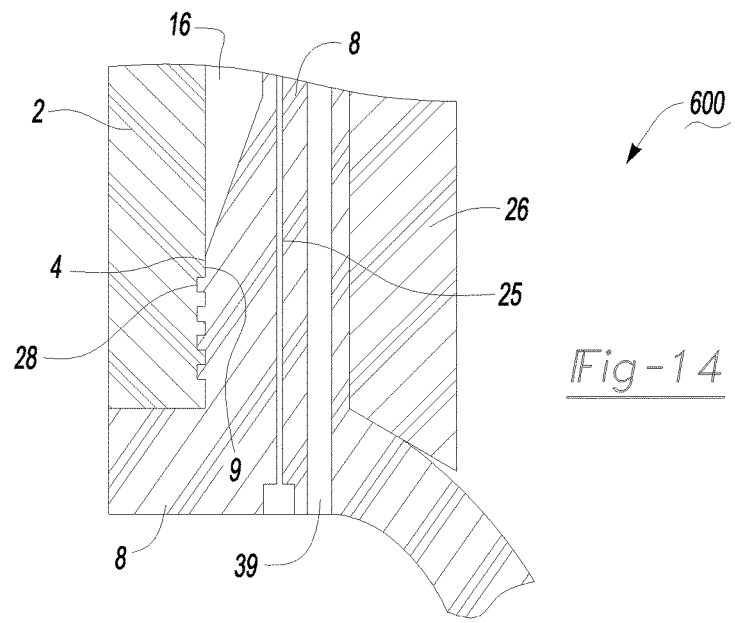
FIG. 14 shows an alternative cross-sectional view of a vehicle assembly joined together according to certain aspects of the present disclosure.

In other variations, it is further contemplated that one or more of the vehicle assembly components described herein include one or more mechanical interlock features for coupling together the various vehicle components. For example, complementary protruding flanges, grooves, channels, locking wings of differing shapes could be used as mechanical interlock features. In particular, as shown in FIG. 13a, at least a portion of polymeric composite pin 39b may comprise one or more mechanical interlock features 28a for increasing surface area of the polymeric composite pin 39b for coupling with the first component 32 and/or the second component 38. Additionally or alternatively, as shown in FIG. 13b, at least a portion of a first component 32a and/or a second component 38a may comprise mechanical interlock features 28b for increasing surface area of the first component 32a and/or the second component 38a for coupling with the polymeric composite pin 39. Additionally or alternatively, as shown in FIG. 14 in alternative engine assembly 600, at least a portion of the exterior surface 4 of the liner 2 may comprise one or more mechanical interlock features 28 for coupling with the housing 8 (e.g., interior surface 9), particularly where the housing 8 is a polymeric composite material. Additionally or alternatively, the cap 27 and or the third terminal surface 11 of the housing 8 may include one or more mechanical interlock (not shown) features for coupling the cap 27 with the housing 8. Additionally or alternatively, ceramic material may be present between various metal and polymeric composite components in the engine assembly for insulation purposes. It is understood herein that the various metal components described herein can be readily machined or cast.

Optionally, the first, second and/or third components may be pretreated prior to arranging the first component in the mold to further enhance assembly of the various components. Pretreating of the first component may comprise or more of the following: cleaning, abrading, etching, applying a chemical primer (e.g., methyl ethyl ketone) and forming at least one mechanical interlock feature as described above in the first component. Etching can include electroetching (electroplating) or rinsing the first component with a suitable acid as described above. Abrading can include sandblasting the surface of the first component or rubbing sandpaper over the surface of the first component followed by rinsing with a solvent (e.g., acetone).

In another particular embodiment, the present disclosure contemplates a method for joining components in an engine assembly. The method may comprise arranging a first component in a mold, wherein the first component defines therein a first channel as described herein; arranging a second component in the mold, wherein the second component defines therein a second channel as described herein; and substantially aligning the first channel with the second channel to define a pin-receiving channel as described herein. The method further comprises inserting at least one polymeric composite pin as described herein comprising a polymer as described herein (e.g., thermoplastic or thermoset resin) and a plurality reinforcing fibers as described herein (e.g., carbon fibers, glass fibers, aramid fibers, polyethylene fibers, ceramic fibers, organic fibers, metallic fibers, and combinations thereof) into the pin-receiving channel thereby joining the first component with the second component. At least one of the first component and the second component comprises a polymeric composite material as described herein. An adhesive as described herein may be disposed adjacent to at least a portion of the at least one polymeric composite pin. In certain aspects, the adhesive may be applied as described herein, e.g., to at least a portion of the surface of the first component and/or the second component, which define the pin-receiving channel, prior to insertion of the polymeric composite pin. The first component and the second component may be selected from the group consisting of a cylinder head as described herein and housing as described herein. The housing may comprise a cylinder housing and a crank housing. Further, the first component may be a metal material metal (e.g., steel, iron, magnesium alloy, aluminum alloy, metal composite) or a ceramic material (e.g., alumina, silicon carbide, ceramic composite), and the second component may be a polymeric composite material as described herein. In particular, the first component may be a metal or ceramic cylinder head and the second component may be a polymeric composite housing.

Additionally or alternatively, the at least one polymeric composite pin may further comprise a cap portion disposed on at least one terminal surface of the polymeric composite pin.

Additionally or alternatively, the at least one polymeric composite pin comprises an inner pin portion as described herein and an outer pin portion as described herein (e.g., having an aperture defined therein for receiving an inner pin portion). The inserting of the at least one polymeric composite pin as described herein into the pin-receiving channel comprises inserting the outer pin portion as described herein into the pin-receiving channel as described herein and inserting the inner pin portion as described herein into the aperture defined in the outer pin portion. The adhesive as described herein may be adjacent to the outer pin portion and inner pin portion, and the method may further comprise applying the adhesive to at least a portion of the surface of the outer pin portion which defines the aperture.

Additionally or alternatively, a third component as described herein may be arranged in the mold and joined to the first and second components as described herein.

In an alternative embodiment, another method for joining components in an engine assembly is provided. The method may comprise arranging a first component in a mold, wherein the first component defines therein a first channel as described herein; arranging a second component in the mold, wherein the second component defines therein a second channel as described herein; and/or arranging a third component as described herein in the mold, wherein the third component defines a third channel as described herein. The method may further comprise substantially aligning the first channel, the second channel and/or the third channel to define a pin-receiving channel as described herein. A polymeric composite pin may be formed in the pin-receiving channel via injection molding. For example, a fluid precursor comprising a plurality of reinforcing fibers as described herein and resin as described herein may be injected or infused into the pin-receiving channel followed by solidifying (e.g., curing or reacting) of the fluid precursor to form the polymeric composite pin thereby joining the first component, the second component, and/or the third component.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for joining components to form an assembly for a vehicle, wherein the method comprises:
    arranging a first component in a mold, wherein the first component defines a first channel therein;
    arranging a second component in the mold, wherein the second component defines a second channel therein;
    substantially aligning the first channel with the second channel to define a pin-receiving channel;
    applying an adhesive to at least a portion of a surface of the first component and the second component, which define the pin-receiving channel; and
    inserting at least one polymeric composite pin comprising a polymer and a plurality of reinforcing fibers into the pin-receiving channel thereby joining the first component with the second component, wherein the at least one polymeric composite pin defines an inner pin portion and an outer pin portion having an aperture defined therein for receiving the inner pin portion, wherein the inserting of the at least one polymeric composite pin into the pin-receiving channel comprises inserting the outer pin portion into the pin-receiving channel and inserting the inner pin portion into the aperture defined in the outer pin portion, and wherein the adhesive is disposed adjacent to the outer pin portion and the inner pin portion.

2. The method of claim 1, wherein the first component and the second component each comprise a material selected from a metal material, a polymeric composite material or a ceramic material.

3. The method of claim 1, wherein the first component is a metal material and the second component is a polymeric composite material.

4. The method of claim 1, wherein the polymer comprises a thermoplastic resin or a thermoset resin and the plurality of reinforcing fibers are selected from the group consisting of: carbon fibers, glass fibers, aramid fibers, polyethylene fibers, organic fibers, metallic fibers, and a combination thereof.

5. The method of claim 1, wherein the at least one polymeric composite pin further comprises a cap portion disposed on at least one terminal surface of the polymeric composite pin.

6. The method of claim 1, further comprising applying a preload to at least one of the first component and the second component.

7. The method of claim 1, wherein the at least one polymeric composite pin comprises at least one mechanical interlock feature.

8. The method of claim 1, wherein the first component and the second component are selected from the group consisting of a cylinder head, a cylinder housing, a crank housing, a turbocharger, air conditioner, a water pump, an exhaust manifold, an intake manifold, a cam cover, an engine cover and an oil pan.

9. The method of claim 1, further comprising applying the adhesive to at least a portion of a surface of the outer pin portion which defines the aperture.

10. The method of claim 1, further comprising:
    arranging a third component in the mold, wherein the third component defines a third channel;
    substantially aligning the first channel with the second channel and the third channel to form the pin-receiving channel; and
    inserting the at least one polymeric composite pin into the pin-receiving channel thereby joining the first component, the second component and the third component.

11. The method of claim 10, wherein the third component is a metal material, a polymeric composite material, or a ceramic material.

12. The method of claim 10, wherein the first component is a cylinder head, the second component is a cylinder housing and the third component is a crank housing.

13. A method for joining components in an engine assembly, wherein the method comprises:
    arranging a first component in a mold, wherein the first component defines a first channel therein;
    arranging a second component in the mold, wherein the second component defines a second channel;
    substantially aligning the first channel with the second channel to define a pin-receiving channel;
    applying an adhesive to at least a portion of a surface of the first component and the second component, which define the pin-receiving channel; and
    inserting at least one polymeric composite pin comprising a polymer and a plurality of reinforcing fibers into the pin-receiving channel thereby joining the first component with the second component, wherein the at least one polymeric composite pin defines an inner pin portion and an outer pin portion having an aperture defined therein for receiving the inner pin portion, wherein the inserting of the at least one polymeric composite pin into the pin-receiving channel comprises inserting the outer pin portion into the pin-receiving channel and inserting the inner pin portion into the aperture defined in the outer pin portion, and wherein the adhesive is disposed adjacent to the outer pin portion and the inner pin portion;
    wherein the first component and the second component are selected from the group consisting of a cylinder head, a cylinder housing, a crank housing, a turbocharger, air conditioner, a water pump, an exhaust manifold, an intake manifold, a cam cover, an engine cover and an oil pan; and
    wherein at least one of the first component and the second component comprises a polymeric composite material.

14. The method of claim 13, wherein the polymer comprises a thermoplastic resin or a thermoset resin and the plurality of reinforcing fibers are selected from the group consisting of: carbon fibers, glass fibers, aramid fibers, polyethylene fibers, organic fibers, metallic fibers, and a combination thereof.

15. The method of claim 13, wherein the first component is a metal material or a ceramic material and the second component is a polymeric composite material.

16. The method of claim 13, wherein the at least one polymeric composite pin further comprises a cap portion disposed at least at one terminal surface of the polymeric composite pin.

* * * * *